US005184000A

United States Patent [19]

Hamada et al.

[11] Patent Number: 5,184,000

[45] Date of Patent: Feb. 2, 1993

[54] AUTOMATIC CASH HANDLING SYSTEM OFFERING OPTIONAL PRINTED RECORD

[75] Inventors: Yasunori Hamada, Tsuchiura; Junichi Oizumi, Ibaraki; Kousuke Noda, Tsuchiura; Kunio Ushijima, Seto, all of Japan

[73] Assignee: Hitachi, Ltd., Tokyo, Japan

[21] Appl. No.: 269,607

[22] Filed: Nov. 10, 1988

[30] Foreign Application Priority Data

Nov. 13, 1987 [JP] Japan ................................ 62-285383

[51] Int. Cl.5 ........................ G06F 15/30; G06F 3/12; G06F 3/14

[52] U.S. Cl. .................................... 235/379; 235/432; 902/18; 902/21; 902/36

[58] Field of Search ........................ 235/379, 432, 381; 902/18, 21, 36

[56] References Cited

U.S. PATENT DOCUMENTS 4,134,537 1/1979 Glaser et al. .......................... 902/21
4,420,751 12/1983 Paganini et al. .................... 235/379
4,795,889 1/1989 Matuura et al. .................... 235/379

FOREIGN PATENT DOCUMENTS 54-159299 12/1979 Japan .
60-117369 6/1985 Japan .

*Primary Examiner*—Davis L. Willis
*Assistant Examiner*—Edward H. Sikorski
*Attorney, Agent, or Firm*—Antonelli, Terry, Stout & Kraus

[57] ABSTRACT

An automatic cash handling system for handling cash transactions with the user using a cash card privately held by him or her. The system comprises a device for issuing a record such as a transaction statement printed with details of a transaction such as deposit, withdrawal or confirmation of balance, and a device for allowing the user to opt for or relinquish the issuance of a record. In operating the system, the user decides whether a record is to be issued or not, and if he requires one, a record issuing devices issues a record printed with transaction data. If he demands no issuance of a record, on the other hand, the transaction data is indicated on an indication device.

5 Claims, 8 Drawing Sheets

AUTOMATIC CASH HANDLING SYSTEM OFFERING OPTIONAL PRINTED RECORD

BACKGROUND OF THE INVENTION

The present invention relates to an automatic cash handling system for processing cash transactions using a cash card of the user, which system is equipped with the function of issuing a record (i.e. a recorded form) such as a transaction statement, or more in particular to an automatic cash handling system having a function adapted to enable the user to opt for issuance of a record.

In conventional automatic cash handling systems, as disclosed in JP-A-54-159299, a transaction statement is issued to the user without regard to his or her desire for such a statement in transactions including deposit, withdrawal or confirmation of balance.

Such a transaction statement may not be issued to the user transacting with his passbook because in that case transaction data is posted in the passbook.

In the above-mentioned prior art systems wherein a statement is issued to the user whether or not the user requires it, no consideration is paid to the intention of the user to utilize the statement, often resulting in a useless and wasteful operation.

An automatic cash handling system is generally loaded with limited numbers of forms for issuing the transaction statements, and when the forms are depleted the system stops its operation, thus making further transactions impossible unless the system is replenished with new forms. This gives rise to the necessity of issuing a statement only when truly required by the user to assure effective utilization of the forms. Such a necessity is not taken into consideration by the conventional systems, which often stops the system operation inconveniently upon depletion of the forms. Especially, a great problem is posed by suspension of the operation of the system when forms run short of supply while the system is unattended by bank personnel on bank holidays.

Further, labor is required in loading statement forms, and the conventional cash handling systems pay no consideration to a labor-saving function either.

On the other hand, JP-A-60-117369 discloses a system comprising means for requiring the user to demand or relinquish a transaction statement and means for indicating details of transactions when the transaction statement is relinquished.

This configuration, however, inconveniently and unnecessarily indicates details of transactions such as the amount transacted or balance till the end of the transactions.

SUMMARY OF THE INVENTION

Accordingly, it is an object of the present invention to provide an automatic cash handling system in which the forms for transaction statements loaded into the system are effectively used to reduce the possibility of suspension of operation of the system upon depletion of the forms while at the same time saving the labor of bank employees in maintaining the system, and when the user does not demand the issuance of a transaction statement, the transaction time is shortened or the transaction data is indicated only for a predetermined length of time for an improved customer service.

Another object of the present invention is to stop the issuance of a statement automatically during a predetermined time period by indicating to the user a choice for receiving or not receiving a statement, thereby to shorten the transaction time during such a time period.

Still another object of the present invention is to stop the automatic issuance of a statement or other records according to the residual amount of forms by giving to the user a choice to receive or not receive a statement thereby to assure effective use of forms and prevent the stopping of the operation which otherwise might be caused upon depletion of the forms.

According to one aspect of the present invention, there is provided an automatic cash handling system comprising record issuance opting means for enabling the user to demand or relinquish the issuance of a transaction record, indication means for indicating details of transactions when the issuance of a statement is relinquished, and erasing means for erasing the transaction data indicated by the indication means. The user starting a transaction with the automatic cash handling system opts for issuance of a record, such as a statement, and enters his desire by way of the record issuance opting means. Only when the issuance is required according to the entry of the user, a statement is issued as in the prior art by record issuance means, while if the issuance of a statement is not demanded, the issuance is suspended by the record issuance means.

In the case where record issuance is not demanded, related transaction data is indicated by indication means, and therefore the user is able to confirm details of his transactions. Thereafter, the transaction data is erased by the erasing means.

According to another aspect of the present invention, there is provided an automatic cash handling system comprising means for stopping the issuance of a record in a predetermined time period or in accordance with the residue of record forms, and means for indicating the stopping of record issuance in advance. When a predetermined time period arrives, the cash handling system automatically actuates the record issuance stop means in response to a signal from means for detecting the arrival of the time period and stops issuing records on subsequent transactions, while at the same time indicating the stopping of the record issuance on the indication means. The residual amount of forms set in the cash handling system is detected by residue detection means, and when the residue is reduced to a predetermined amount, the record issuance stop means is energized automatically in response to a detection signal from the detection means, thereby stopping the record issuance on subsequent transactions, while at the same time indicating the record issuance stop on the indication means.

DESCRIPTION OF THE PREFERRED EMBODIMENTS

An embodiment of the present invention will be explained below with reference to FIGS. 1, 2 and 3.

Figure 1:
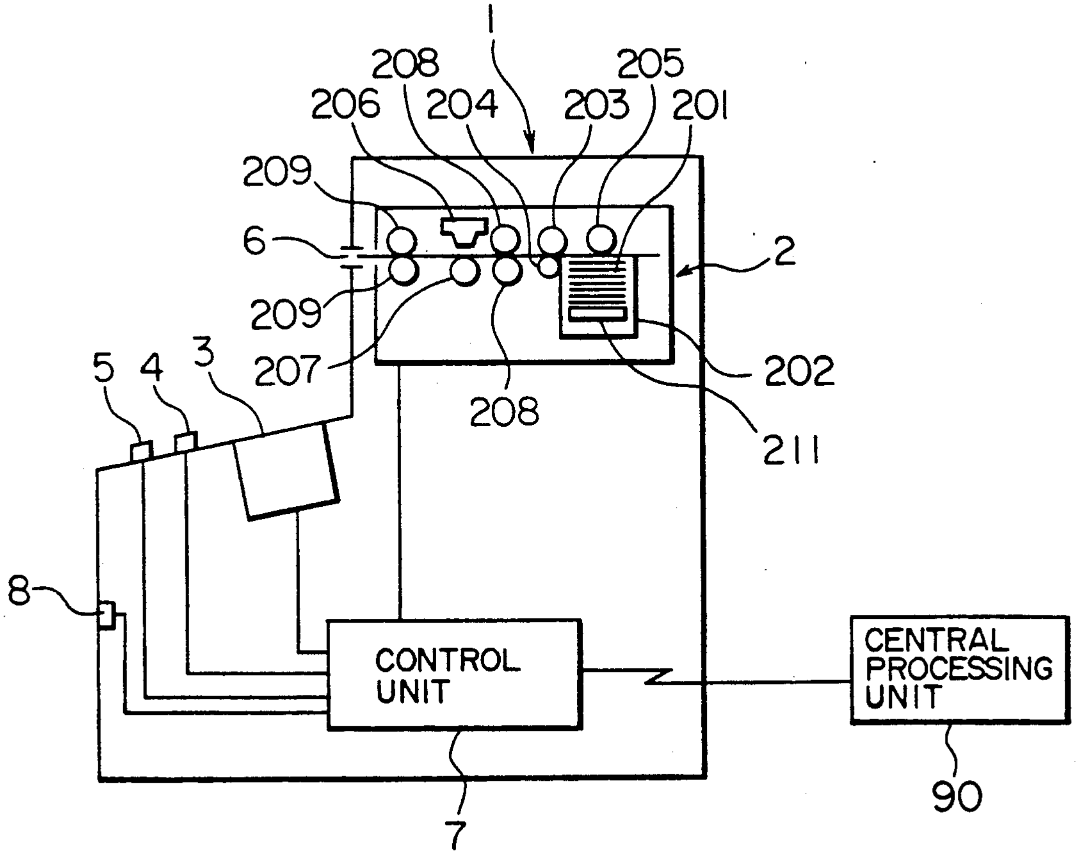
FIG. 1 is a longitudinal sectional view schematically showing an automatic cash handling system according to an embodiment of the present invention.

FIG. 1 is a diagram schematically showing a configuration of an automatic cash handling system directly related to the present invention. The cash handling system 1 comprises a record issuance means 2 for issuing records, such as a transaction statement, indication means 3 for indicating operating instructions or data (or information) to the user, record issuance opting means 4 comprised of a pushbutton or the like for enabling the user to opt for the issuance of a record, input means 5 for indicating the transaction detail on the indication means 3 when the user is not desirous of the issuance of a record and enabling the user to enter his confirmation of the transaction detail indicated, and a record delivery port 6 for delivering a record. The system 1 also comprises a control unit 7 for controlling the various parts of the system and an approach sensor 8 for detecting the user approaching the cash handling system 1.

The record issuance means 2 is configured as explained below. Reference numeral 202 designates a hopper for storing a plurality of forms 201 on a pressure plate 211, numeral 203 a roller for supplying forms 201 one by one from the hopper 202, a roller 204 opposed to the roller 203, and a roller 205 disposed in contact with the top of the forms stored in the hopper 202. The roller 205 is for supplying the forms 201 from the hopper 202 toward the rollers 203, 204 making up a separation mechanism. The rollers 203 and 204 are arranged to separate a bunch of forms fed thereby one by one, the roller 203 rotates in the forward direction of supply while the roller 204 is kept stationary, as an example. This separation mechanism is only illustrative, and another type of separation mechanism may be used with the same effect according to the invention. Roller pairs 208 and 209 are comprised of a pair of rollers respectively in opposed relationship with each other for transporting the forms 201 separated by the rollers 203, 204 and supplied from the hopper 202. A printer head 206 is a head for printing a data on the forms 201, and a roller 207 for supporting a form 201 under printing by the printer head 206. According to the present embodiment, the shown printer head is that of a wire-dot printer, which may be replaced by another type of printer such as ink jet without departing from the spirit of the invention. A printed form supplied through the rollers 209 is delivered to the user by way of the record delivery port 6.

Figure 2:
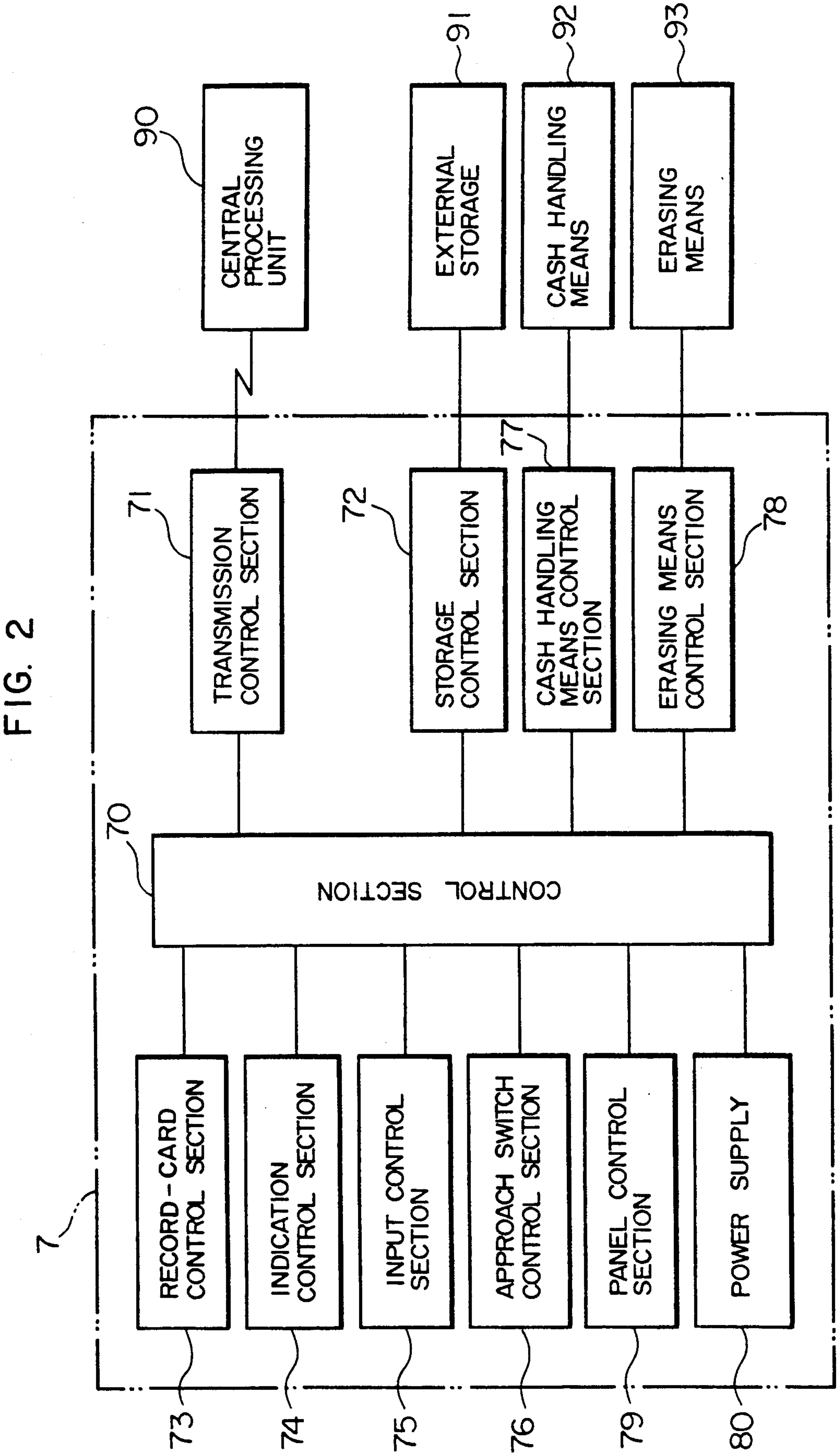
FIG. 2 is a diagram for explaining a configuration of a control means of the system.
Figure 3:
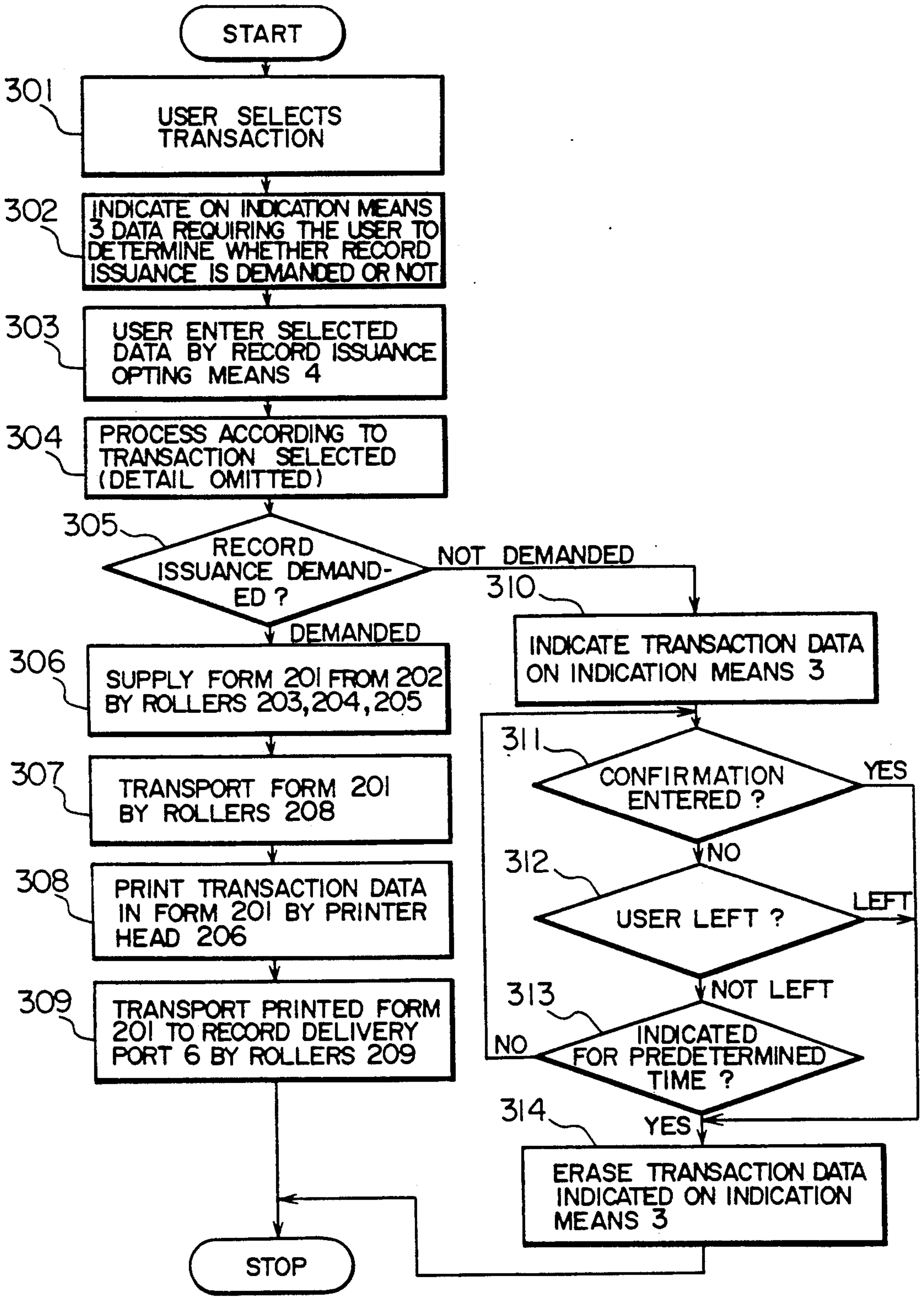
FIG. 3 is a flowchart of operation according to the embodiment shown in FIG. 1.

An example of the configuration of the control unit 7 in FIG. 1 is shown in FIG. 2. The control unit 7 includes a control section 70 having a microprocessor. The control section 70 is connected with a transmission control section 71 for controlling the communication line with a central processing unit 90 and a control section 72 for controlling an external memory 91 such as a magnetic disk unit. The control section 70 is also connected with a record-card control section 73 for controlling the record issuance means 2 and a magnetic card privately held by the user, an indication control section 74 for applying data to the indication means 3 for indicating operating instructions or transaction data, an input control section 75 supplied with input data from the record issuance opting means 4 or input means 5, an approach control section 76 for applying a control command in response to a signal from the approach sensor 8, a cash control section 77 for controlling the cash handling means 92 for performing such operations as cash payment in accordance with the instructions of the user, an erasing means, control section 78 for controlling the erasing means 93 for erasing the transaction detail indicated on the indication means 3, a panel control section 79 for controlling the panel to be operated by bank employees or the like, and a power supply 80.

The operation of this system will be explained with reference to the flowchart of FIG. 3.

The user of the automatic cash handling system first selects the type of transaction he wants including deposit, withdrawal or balance check by means of input control section 75 using his own private cash card (Step 301). The input means used for this process, though not shown, corresponds to the input means 5. Upon selection of a transaction by the user, an inquiry regarding whether the issuance of a record is required or not is sent from the control unit 7 to indication means 3 in accordance with the transaction selection data and is displayed on the indication means 3 (step 302). In accordance with the displayed inquiry, the user inputs the data representative of his selection by means of the record issuance opting means 4. The cash handling system 1, in accordance with the transaction selection data of the user, counts and delivers to the user paper money by the operation of cash handling means 92 if the required transaction is withdrawal (step 304). The demand of the user on the issuance or non-issuance of a record is then processed by selection (step 305). If the user demands issuance of a record, one form 201 in the hopper 202 is separated by rollers 203, 204 and 205 (step 306), and the separated form 201 is fed by rollers 208 toward a printer head 206 (step 307). The form 201 thus fed is printed with transaction data or the like by the printer head 206 (step 308). The form 201 thus printed, that is, a record 201 is sent by rollers 209 to the record delivery port 6 (step 309), and is received by the user.

If the user does not demand the issuance of a record 201 in the process of selection of issuance or non-issuance of a record (step 305), on the other hand, the control unit 7 indicates the related transaction data on the indication means 3 (step 310). This indicated data is checked by the user, who enters the acknowledgement by way of the input means 5, so that the process proceeds to step 314. In the absence of such an input, the process is passed to step 312 (step 311). When an approach sensor 8 for detecting whether the user has left the cash handling system 1 detects that the user has left the system, the process proceeds from step 312 to step 314, and if the user not having left the system is detected, proceeds to step 313 (step 312). Step 313 operates differently depending on whether a predetermined time has passed or not from the initiation of the indication on the indication means 3. If the predetermined time has not passed, the process returns to step 311, and if passed, the process proceeds to step 314 (step 313). Step 314 erases the indication of the transaction data from the indication means 3 in compliance with a command from the control unit 7 (step 314). Upon completion of this inventive series of steps according to the invention, the cash handling system 1 proceeds to another series of steps not described.

According to the present embodiment, if the user of the cash handling system does not demand the issuance of a record, the transaction data is indicated on the indication means but no record is issued. If the user demands the issuance of a record, a record can be issued. In view of this option of the user on the issuance of a record, the processing time is reduced if the user does not demand the issuance of a record. Also, forms are saved by the amount relinquished by the users. The services to a greater number of users is thus made possible on the one hand while at the same time saving the labor of bank employees for replenishing the forms.

The step 312 of the embodiment under consideration, in which a signal from an approach sensor is processed, may be eliminated without affecting the spirit of the invention.

Figure 4:
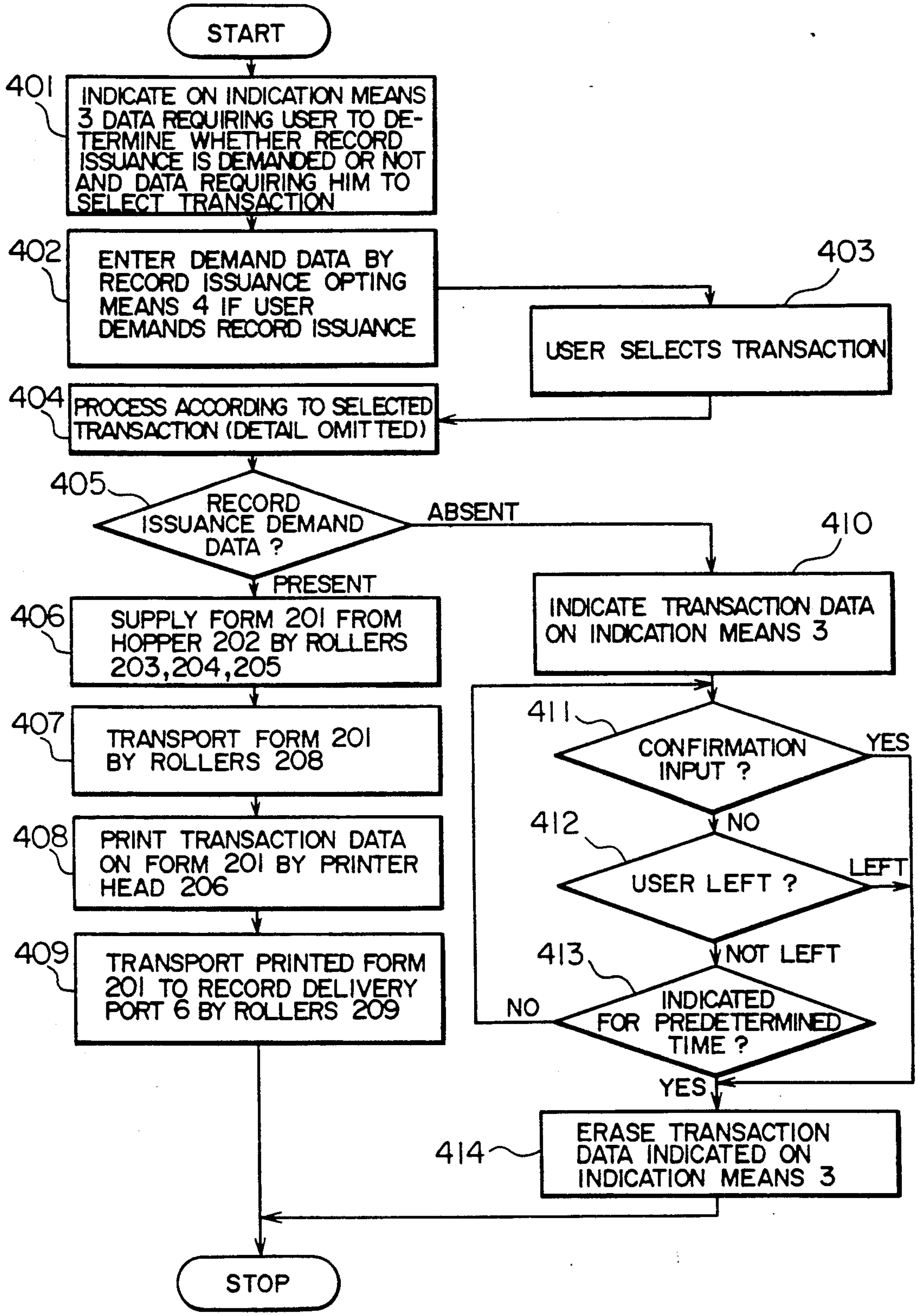
FIG. 4 is a flowchart of operation according to another embodiment of the present invention.

FIG. 4 is a flowchart of operation according to another embodiment of the invention.

In this case, the cash handling system is constructed not to issue any record in ordinary transactions, and when the record is desired, the user enters a data for demanding the issuance of the record from a record issuance opting means 4 of the system.

Explanation will be made with reference to the flowchart of FIG. 4.

With the starting of operation of the automatic cash handling system, data inquiring about whether the user demands the issuance of a record or not and a data requesting the selection of a transaction are indicated on the indication means 3 (step 401). In accordance with this display, the user enters a data demanding the record issuance by way of the record issuance opting means 4 if he demands the record issuance (step 402). The user then proceeds to select a transaction by use of the operating means 75 (step 403). In accordance with the selected transaction data of the user, the cash handling system 1 performs a series of processes for delivering paper money to the user if the transaction is withdrawal (step 404). As the next step, appropriate process is performed in accordance with the presence or absence of the data demanding record issuance (step 405). If the data demanding record issuance is "absent" in this process, that is, if the user does not enter any data in answer to the inquiry about the user's demand or relinquishing the demand for record issuance, the process proceeds along the flow from step 410 to step 414. This flow is the same as that from step 310 to 314 in the flowchart of FIG. 3.

In the case where the demand for record issuance is "present", that is, in the case where the user enters data in answer to the inquiry about the user's demanding or relinquishing the demand for record issuance, the process proceeds along the flow from step 406 to 409. This flow is the same as that from step 306 to 309 in the flowchart of FIG. 3.

As a result of the operation along this flow, a record is issued only upon demand of the user, and no record is issued in ordinary transactions, thus securing more effective utilization of forms such as transaction statement and saving the time required for record issuance.

Figure 5:
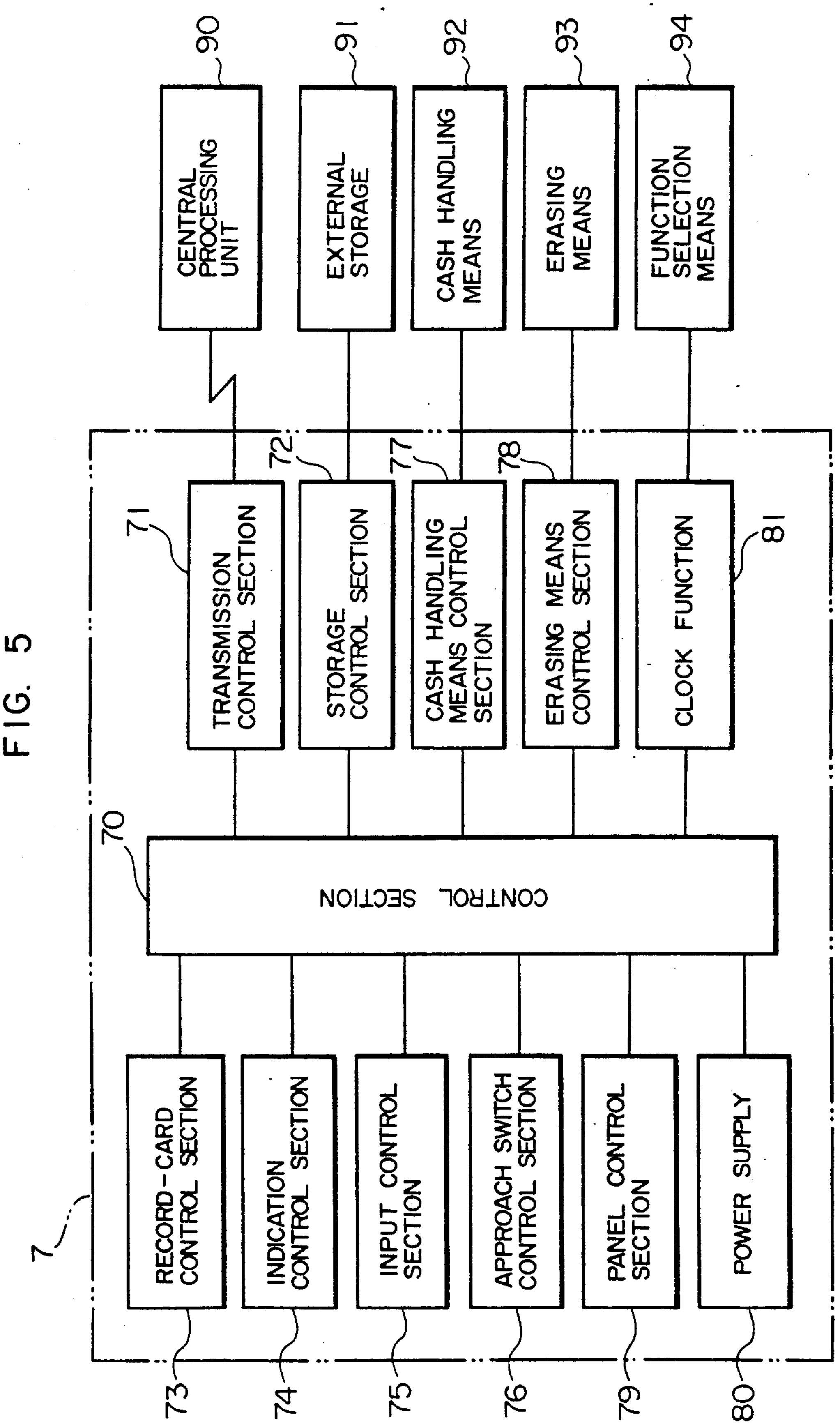
FIG. 5 is a diagram for explaining the configuration of a control means according to a further embodiment of the invention.
Figure 6:
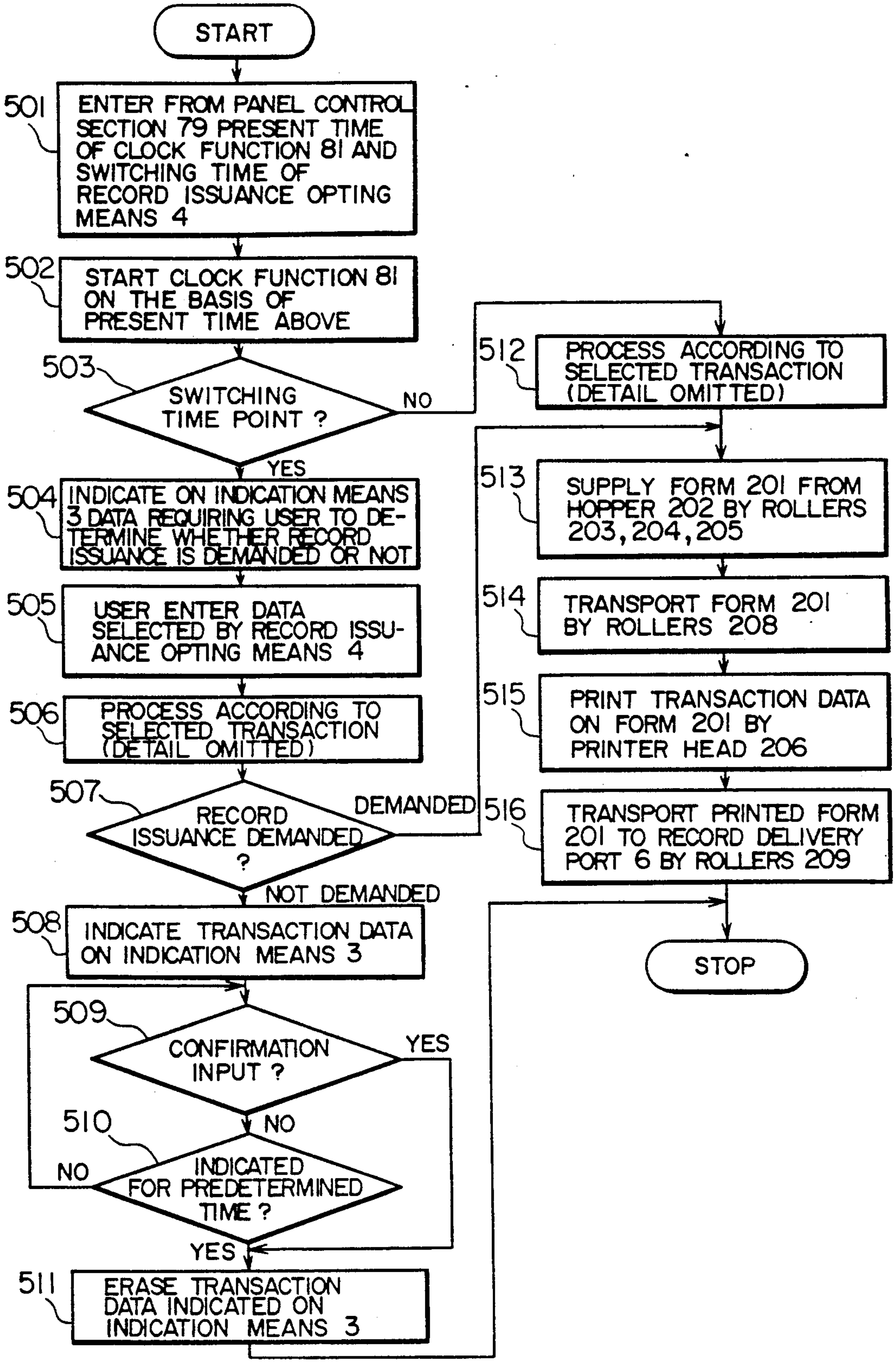
FIG. 6 is a flowchart of operation according to an embodiment comprising the control means shown in FIG. 5.

Another embodiment of the invention is shown in FIGS. 5 and 6. The system according to this embodiment is configured substantially the same way as that shown in FIG. 1, and therefore the explanation of the configuration will be omitted. In this embodiment, the function of opting for record issuance is selectively added by function selecting means 94. This function selecting means 94, as shown in FIG. 5, is operatively interlocked with a clocking function section 81 of the control unit 7. In this embodiment, the other control sections of the control unit 7 have the same configuration as the control unit shown in FIG. 2.

Now, the operation of this embodiment will be explained with reference to the flowchart of FIG. 6.

In starting the operation of the automatic cash handling system 1 shown in FIG. 1, the bank employee in charge of the operation sets the present time and a time point of switching the record issuance opting means 4 from "on" to "off" or "off" to "on" by means of the control section 79 (step 501). As a result, the clocking function 81 starts to work from the present time point (step 502). When the user intends to operate the cash handling system 1, step 503 decides whether the switching time has arrived or not. If the switching time has not yet arrived, the process proceeds to step 512, where the system 1 counts paper money and delivers it to the user if, for example, the transaction selected is withdrawal in accordance with the user's transaction requirement (step 512). One of the forms in the hopper 202 is then separated by the rollers 203, 204 and 205 (step 513), the separated form 201 is transported by the rollers 208 (step 514), and transaction data is printed on the form 201 by the printer head 206 (step 515). The form 201 thus printed is transported to the record delivery port 6 (step 516) and is received by the user as a record.

In the case where step 503 decides that the switching time has arrived, on the other hand, a data inquiring about whether the user demands or relinquishes the demand for record issuance is displayed on the indication means 3 (step 504). The user accordingly enters selection data by way of the record issuance opting means 4 (step 505). In accordance with the transaction selection data selected by the user, the system performs processings such as counting paper money and delivering it to the user if the transaction selected by the user is, for example, withdrawal (step 506). Then, in accordance with whether or not the user is demanding record issuance, an appropriate step is then selected (step 507). If the user demands record issuance, the process proceeds to step 513. In the case where the issuance of a record is not demanded at step 507, the transaction data is displayed on the indication means 3 (step 508). When the user watching the data displayed on the indication means 3 confirms the displayed information by the input means 5, the transaction data on the indication means 3 is erased (step 511). If there is no entry of confirmation at step 509, the next step to be taken differs depending on whether a predetermined time has passed or not from the start of indication on the indication means 3 (step 510). If the predetermined time is not passed, the process returns to step 509, while if the predetermined time has passed, the process advances to step 511. After these steps, the operation associated with the present invention is completed, and the system proceeds to other operations not described herein.

According to this embodiment, the function of the record issuance opting means is turned on or off at any time of operation of the cash handling system according to the turnout of users or other factors. Specifically, when the turnout of users is small, records are issued to all the users to shorten the processing time, while when there are many users waiting, the record issuance opting function is turned on, so that the issuance of records not demanded by users is avoided thereby to save a shortage of forms, thus reducing cases of shutdown of the cash handling system due to depletion of forms.

In this embodiment, the present time and the switching time for the record issuance opting means are set by the panel control section 79. As an alternative, such time points may be specified as a command from an external central processing unit 90. In consideration of the unattended operation on holidays, the alternative method permits a plurality of similar systems to be controlled simultaneously for a further improved operating efficiency.

Figure 7:
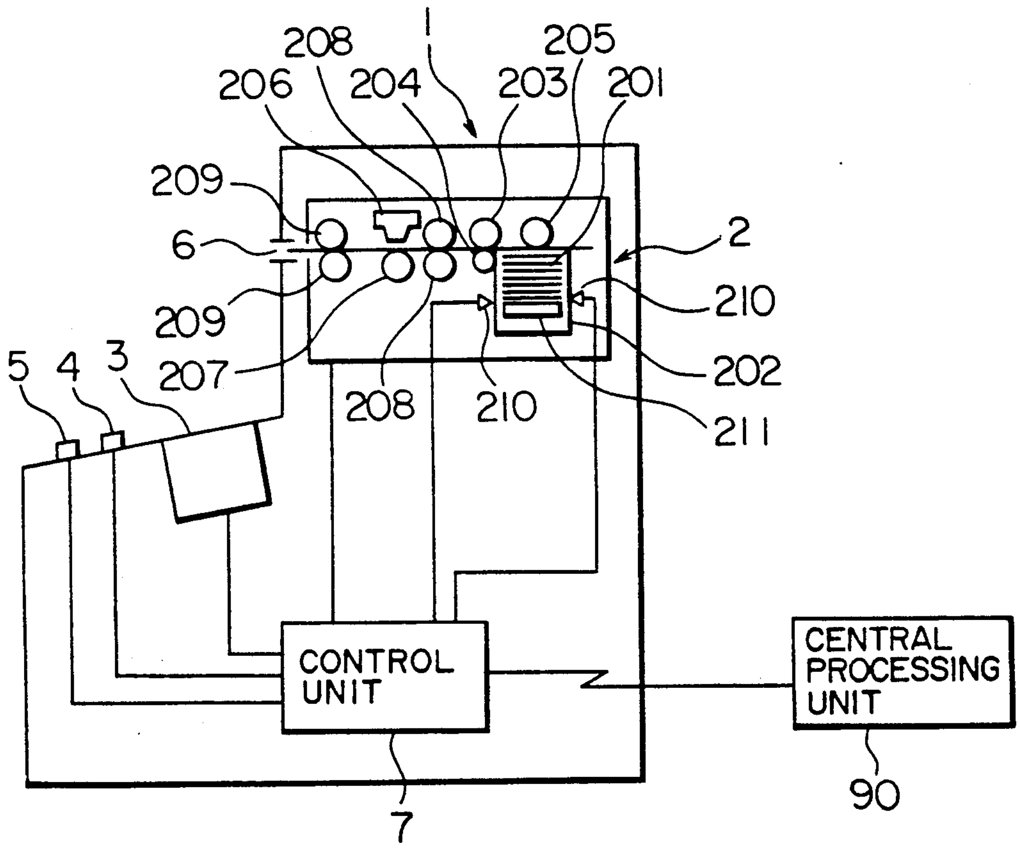
FIG. 7 is a longitudinal sectional view schematically showing still another embodiment of the invention.
Figure 8:
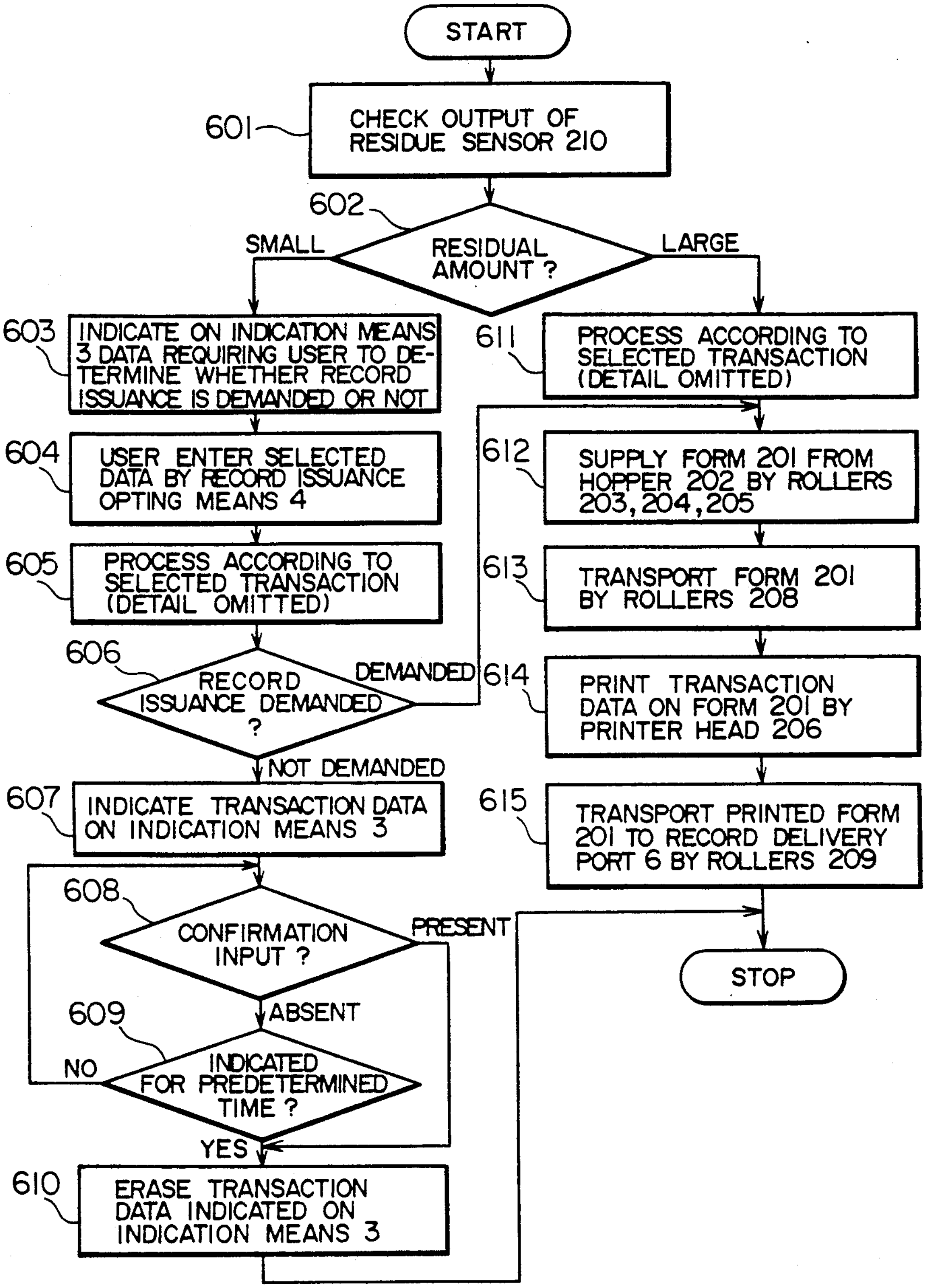
FIG. 8 is a flowchart of operation according the embodiment shown in FIG. 7.

Still another embodiment of the invention is shown in FIGS. 7 and 8. FIG. 7 is a longitudinal sectional view showing the system schematically, and FIG. 8 a flowchart of operation thereof.

According to this embodiment, the function of the record issuance opting means for opting for the issuance of a record such as a transaction statement is switchable in accordance with the amount of forms 201 remaining in the hopper 202. For this purpose, the embodiment under consideration, as shown in FIG. 7, comprises a hopper 202 including form residue detection means 210 such as an optical residue sensor for detecting the remaining amount of forms 201. The form residue detection means 210 detects whether the pressure plate 211 is located higher or lower than the means 210, and according to the result of this detection, detects the residual amount of the forms 201 on the pressure plate 211. The data thus obtained is applied to the control unit 7. With this, the function of the record issuance opting means is switched.

The operation of this embodiment will be explained below with reference to the flowchart of FIG. 8.

An output signal from a form residue detection means 210 in a hopper 202 is checked (step 601), and in accordance with this output signal, subsequent steps are selected at step 602 depending upon the residual amount. If step 602 determines that the residual amount is great, the process proceeds along the flow from step 611 to step 615. This flow is the same as that from step 512 to 516 in the flowchart of FIG. 6.

If step 602 determines that the residual amount of forms is small, on the other hand, the process proceeds along the flow from step 603 to 610. This flow of steps is the same as that from step 504 to 511 in the flowchart of FIG. 6.

According to this embodiment, the residual amount of the forms 201 in the hopper 202 is directly detected to turn on the function of the record issuance opting means or turn it off, and therefore it is possible to reduce cases of shutdown of the cash handling system without fail which otherwise might be caused more frequently due to the shortage of forms.

We claim:

1. An automatic cash handling system for handling cash transactions with the user by use of a privately-held cash card, comprising:

means for issuing a record such as a transaction statement;

record issuance opting means for allowing the user to indicate whether the user demands record issuance before the cash handling system starts executing a processing in accordance with a transaction designated by the user;

indication means for indicating transaction data when the cash handling system starts the processing and the user relinquishes the demand for record issuance;

input means for allowing the user to enter confirmation data for confirming the transaction data indicated on the indication means;

function selecting means for selectively enabling or disabling said record issuance opting means; and control means for controlling said issuing means, said record issuance opting means, said indication means, said input means and said function selecting means.

2. An automatic cash handling system according to claim 1, further comprising clocking means for controlling said function selecting means to disable said record issuance opting means so as to issue a record for each transaction when the current time has not reached a time point set in advance and enable said record issuance opting means to allow the user to decide whether issuance of a record is required or not when the current time has reached the time point, thereby changing the operation of the record issuing means before and after the time point.

3. An automatic cash handling system according to claim 1, further comprising residual form detecting means for detecting the amount of forms remaining in a hopper, wherein said function selecting means is operatively interlocked with said residual form detection means for disabling said record issuance opting means to issue a record for each transaction when a residual amount of forms available to said issuing means exceeds a predetermined value, and for enabling said record issuance opting means so as to allow the user to select issuance or non-issuance of a record, thereby changing the record issuance operation depending on the residual amount of forms relative to the predetermined value.

4. An automatic cash handling system comprising:

means for issuing a record, such as a transaction statement;

indicating means for indicating data to the user;

record issuance opting means for allowing the user to indicate whether issuance of a record by said issuing means is required;

function selecting means for selectively enabling or disabling said record issuance opting means;

means for setting a time point to switch the state of the record issuance opting means between enabled and disabled states before the cash handling system starts executing a processing in accordance with a transaction designated by the user;

means for determining by comparison whether the present time corresponds to the time point set by said setting means;

said record issuance opting means energizes said issuing means to automatically issue a record for each transaction when the present time has not reached said time point without regard to the user's decision regarding the issuance of a record;

means for enabling said function selecting means to indicate data, requesting the user to input request data indicating whether a record is to be issued, on said indicating means, thereby enabling the user to decide whether the record issuance is required and for controlling said issuing means in accordance with said request data from the user, when the present time has reached said time point; and means for indicating transaction data on said indication means when the user relinquishes the right to record issuance.

5. An automatic cash handling system comprising:

means for issuing a record, such as a transaction statements on a form;

function selecting means for selectively enabling or disabling said record issuing means;

record issuance opting means for allowing the user to indicate whether a record is to be issued;

residual form amount detection means for detecting the amount of forms remaining in a hopper;

means for comparing, before the cash handling system starts a processing in accordance with a transaction designated by the user, the amount of forms detected by said residual form amount detection means with a value set in advance and for energizing said issuing means, prior to start of said processing by said cash handling system of said transaction designated by the user, when the detected residual amount has not reached the set value;

means for enabling said function selecting means to indicate data, requesting the user to input request data indicating whether record issuance is required, prior to start of said processing by said cash handling system of said transaction designated by the user, when the detected residual amount has reached the set value, thereby enabling the user to decide whether a record is to be issued and for controlling said issuing means on the basis of the request data;

means for indicating transaction data when the user relinquishes the right to record issuance; and means for energizing the record issuing means when the user demands record issuance.

* * * * *